(12) United States Patent
Anderson et al.

(10) Patent No.: US 7,751,072 B2
(45) Date of Patent: Jul. 6, 2010

(54) AUTOMATED MODIFICATION OF A MARKING ENGINE IN A PRINTING SYSTEM

(75) Inventors: David G. Anderson, Ontario, NY (US); Charles Anthony Radulski, Macedon, NY (US); Robert M. Lofthus, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1293 days.

(21) Appl. No.: 11/137,273

(22) Filed: May 25, 2005

(65) Prior Publication Data

US 2006/0066885 A1    Mar. 30, 2006

Related U.S. Application Data

(63) Continuation-in-part of application No. 10/953,953, filed on Sep. 29, 2004, now abandoned.

(51) Int. Cl.
*G06F 3/12* (2006.01)
*G03G 15/00* (2006.01)
*G03G 15/16* (2006.01)
*G03G 15/20* (2006.01)

(52) U.S. Cl. .................. 358/1.13; 358/1.15; 399/44; 399/45; 399/46; 399/47; 399/67; 399/68; 399/69

(58) Field of Classification Search ................. 358/1.14, 358/1.15
See application file for complete search history.

(56) References Cited

U.S. PATENT DOCUMENTS

| | | | |
|---|---|---|---|
| 4,579,446 A | 4/1986 | Fujino et al. |
| 4,587,532 A | 5/1986 | Asano |
| 4,797,706 A | 1/1989 | Sugishima et al. |
| 4,836,119 A | 6/1989 | Siraco et al. |
| 5,004,222 A | 4/1991 | Dobashi |
| 5,080,340 A | 1/1992 | Hacknauer et al. |
| 5,095,342 A | 3/1992 | Farrell et al. |

(Continued)

FOREIGN PATENT DOCUMENTS

EP    0588513    3/1994

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Twyler L Haskins
*Assistant Examiner*—Dennis Dicker
(74) *Attorney, Agent, or Firm*—Fay Sharpe LLP; Eugene O. Palazzo

(57) ABSTRACT

A method of printing includes processing a print job stream to identify one or more images to be printed on a first substrate. The first substrate has a substrate attribute, such as paper weight or surface roughness, which is different from that of a second substrate. A marking engine is selected to print the identified images on the selected first substrate. An operating parameter of the marking engine is modified from a set point for the second substrate to a modified set point for the first substrate, to accommodate the substrate attribute of the selected first substrate. The identified images are sent to the selected marking engine to be printed.

25 Claims, 5 Drawing Sheets

U.S. PATENT DOCUMENTS

| | | | |
|---|---|---|---|
| 5,159,395 | A | 10/1992 | Farrell et al. |
| 5,208,640 | A | 5/1993 | Horie et al. |
| 5,272,511 | A | 12/1993 | Conrad et al. |
| 5,326,093 | A | 7/1994 | Sollitt |
| 5,435,544 | A | 7/1995 | Mandel |
| 5,471,313 | A * | 11/1995 | Thieret et al. ............... 358/296 |
| 5,473,419 | A | 12/1995 | Russel et al. |
| 5,489,969 | A | 2/1996 | Soler et al. |
| 5,504,568 | A | 4/1996 | Saraswat et al. |
| 5,525,031 | A | 6/1996 | Fox |
| 5,557,367 | A | 9/1996 | Yang et al. |
| 5,559,933 | A * | 9/1996 | Boswell ..................... 358/1.15 |
| 5,568,246 | A | 10/1996 | Keller et al. |
| 5,570,172 | A | 10/1996 | Acquaviva |
| 5,596,416 | A | 1/1997 | Barry et al. |
| 5,629,762 | A | 5/1997 | Mahoney et al. |
| 5,710,968 | A | 1/1998 | Clark et al. |
| 5,778,377 | A | 7/1998 | Marlin et al. |
| 5,884,910 | A | 3/1999 | Mandel |
| 5,995,721 | A | 11/1999 | Rourke et al. |
| 6,059,284 | A | 5/2000 | Wolf et al. |
| 6,097,500 | A | 8/2000 | Fromherz |
| 6,125,248 | A | 9/2000 | Moser |
| 6,241,242 | B1 | 6/2001 | Munro |
| 6,297,886 | B1 | 10/2001 | Cornell |
| 6,341,773 | B1 | 1/2002 | Aprato et al. |
| 6,363,230 | B1 | 3/2002 | Masai |
| 6,384,918 | B1 | 5/2002 | Hubble, III et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,641 | B1 | 8/2003 | Alexandrovich et al. |
| 6,608,988 | B2 | 8/2003 | Conrow |
| 6,612,566 | B2 | 9/2003 | Stoll |
| 6,612,571 | B2 | 9/2003 | Rider |
| 6,618,167 | B1 | 9/2003 | Shah |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,654,136 | B2 | 11/2003 | Shimada |
| 6,819,906 | B1 | 11/2004 | Herrmann et al. |
| 7,027,187 | B1 * | 4/2006 | Zuber ........................ 358/1.9 |
| 7,229,225 | B2 * | 6/2007 | Lermant et al. ............... 400/76 |
| 2002/0078012 | A1 | 6/2002 | Ryan et al. |
| 2002/0103559 | A1 | 8/2002 | Gartstein |
| 2002/0146254 | A1 * | 10/2002 | Richtsmeier ................. 399/68 |
| 2003/0077095 | A1 | 4/2003 | Conrow |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0165897 | A1 * | 8/2004 | Hooper et al. ................ 399/44 |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004, Lofthus, et al.
U.S. Appl. No. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. Appl. No. 11/000,158, filed Nov. 30, 2004, Roof.
U.S. Appl. No. 11/000,168, filed Nov. 30, 2004, Biegelsen, et al.
U.S. Appl. No. 11/000,258, filed Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Viturro, et al.
U.S. Appl. No. 11/081,473, filed Mar. 16, 2005, Moore.
U.S. Appl. No. 11/069,020, filed Feb. 28, 2005, Lofthus, et al.
U.S. Appl. No. 11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.
U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, filed Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.
U.S. Appl. No. 11/093,229, filed Mar. 29, 2005, Julien.
U.S. Appl. No. 11/102,899, filed Apr. 8, 2005, Crawford, et al.
U.S. Appl. No. 11/102,910, filed Apr. 8, 2005, Crawford, et al.
U.S. Appl. No. 11/115,766, filed Apr. 27, 2005, Grace.
U.S. Appl. No. 11/120,589, filed May 3, 2005, Contino.
U.S. Appl. No. 11/102,332, filed Apr. 8, 2005, Hindi, et al.
U.S. Appl. No. 11/136,959, filed May 24, 2005, Lofthus, et al.
U.S. Appl. No. 11/137,634, filed May 24, 2005, Lofthus, et al.
U.S. Appl. No. 11/137,251, filed May 24, 2005, German, et al.

* cited by examiner

AUTOMATED MODIFICATION OF A MARKING ENGINE IN A PRINTING SYSTEM

CROSS-REFERENCE TO RELATED APPLICATIONS

This application claims the benefit, as a Continuation-in-Part, of U.S. application Ser. No. 10/953,953, filed Sep. 29, 2004 now abandoned, entitled "CUSTOMIZED SET POINT CONTROL FOR OUTPUT STABILITY" (as amended), by Charles A. Radulski, et al., the disclosure of which is totally incorporated herein by reference.

The following applications, the disclosures of each being totally incorporated herein by reference are also mentioned:

U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES," by David G. Anderson, et al.;

U.S. application Ser. No. 10/917,768, filed Aug. 13, 2004, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. application Ser. No. 10/924,106, filed Aug. 23, 2004, entitled "PRINTING SYSTEM WITH HORIZONTAL HIGHWAY AND SINGLE PASS DUPLEX," by Lofthus, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. application Ser. No. 10/924,459, filed Aug. 23, 2004, entitled "PARALLEL PRINTING ARCHITECTURE USING IMAGE MARKING ENGINE MODULES (as amended)," by Barry P. Mandel, et al;

U.S. application Ser. No. 11/069,020, filed Feb. 28, 2004, entitled "PRINTING SYSTEMS," by Robert M. Lofthus, et al.;

U.S. application Ser. No. 11/095,872, filed Mar. 31, 2005, entitled "PRINTING SYSTEM," by Paul C. Julien;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.; and U.S. application Ser. No. 11/122,420, filed May 5, 2005, entitled "PRINTING SYSTEM AND. SCHEDULING METHOD," by Austin L. Richards.

BACKGROUND

The present exemplary embodiment relates generally to a printing system comprising at least two marking engines and more particularly to a printing system which allows automated modification of the xerographic subsystems in at least one of the at least two marking engines to accommodate a different print media substrate than that normally used.

In a typical xerographic marking engine, such as a copier or printer, a photoconductive insulating member is charged to a uniform potential and thereafter exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with a developing material. Generally, the developing material comprises toner particles adhering triboelectrically to carrier granules. The developed image is subsequently transferred to a print medium, such as a sheet of paper. The fusing of the toner onto the paper is generally accomplished by applying heat to the toner with a heated roller and application of pressure.

A common trend in the maintenance of office equipment, particularly copiers and printers, is to organize the machine on a modular basis, wherein certain distinct subsystems of a machine are bundled together into modules which can be readily removed from machines and replaced with new modules of the same type. A modular design facilitates a greater flexibility in terms of replacement and repair, which can take place at a remote location.

Printing systems which incorporate several small marking engines have recently been developed, as described for example, in the above-referenced co-pending applications. These systems enable high overall outputs to be achieved by printing portions of the same document on multiple marking engines. Such systems are commonly referred to as "tandem engine" printers, "parallel" printers, or "cluster printing" systems (in which an electronic print job may be split up for distributed higher productivity printing by different marking engines, such as separate printing of the color and monochrome pages). Such integrated printing systems may include a common print media source which supplies print media to each of the marking engines.

In such printing systems, printing on media of varying substrate weight, surface roughness, and coating weight is difficult because the marking engines typically have insufficient latitude to mark and fuse these off-normal substrates at full productivity. Thus the speed of the marking engine is slowed to provide good image quality.

One of the primary limitations encountered when trying to run heavy or coated stock through a xerographic marking engine at high speeds is fusing latitude. Heavy sheets have a larger mass and tend to absorb relatively more heat from the fuser than normal sheets. As a result, the allocation of power to the fusing subsystem of a marking engine can result in the fuser not having sufficient power to handle the high thermal mass materials without experiencing "droop," the term applied to a drop in fuser roll temperature with time. Typically, single marking engines employ strategies such as "skip pitch" to lower the throughput of the fuser in order to accommodate heavy weight substrate materials. The result is a reduction in the overall efficiency and throughput rate of the machine. In a printing system with multiple marking engines, the throughput of the entire system would be compromised by such a measure and thus use of heavy sheets is avoided.

REFERENCES

The following references, the disclosures of which are incorporated herein by reference in their entireties, variously relate to "tandem engine" printers, "parallel" printers, "cluster printing," and "output merger" or "interposer" systems: U.S. Pat. No. 5,568,246 to Keller, et al., U.S. Pat. No. 4,587,532 to Asano, U.S. Pat. No. 5,570,172 to Acquaviva, U.S. Pat. No. 5,596,416 to Barry, et al.; U.S. Pat. No. 5,995,721 to Rourke et al; U.S. Pat. No. 4,579,446 to Fujino; U.S. Pat. No.

5,389,969 to Suzuki; a 1991 "Xerox Disclosure Journal" publication of November-December 1991, Vol. 16, No. 6, pp. 381-383 by Paul F. Morgan; and a Xerox Aug. 3, 2001 "TAX" publication product announcement entitled "Cluster Printing Solution Announced."

BRIEF DESCRIPTION

Aspects of the present exemplary embodiment disclosed herein relate to a method of printing and to a printing system. The method includes processing a print job stream to identify at least one image to be printed with a first substrate selected from at least two substrates. The first substrate has a different substrate attribute from a second of the at least two substrates. One of at least two marking engines which are configured for printing images of a common print job stream is selected to print the identified images on the selected first substrate. An operating parameter of the selected one of the at least two marking engines is modified from a set point for the second of the substrates to a modified set point for the first substrate based upon the substrate attribute of the selected first substrate. The at least one identified image is sent to the selected one of the at least two marking engines to be printed. A completed image is formed on the selected first substrate with the selected one of the at least two marking engines.

A printing system includes at least two marking engines for printing images of a common print job stream and a processor for processing the print job stream to identify an image to be printed on a first substrate selected from at least two substrates. The first substrate differs in at least one attribute from a second of the at least two substrates. A job planner/scheduler is in communication with the processor for selecting one of the at least two marking engines to print the identified image on the selected first substrate. An actuator modifies an operating parameter of the selected one of the at least two marking engines from a normal set point for the second substrate to an modified set point for the selected first substrate. A processing component sends the identified image to the selected one of the at least two marking engines to be printed.

A xerographic system includes first and second marking engines which apply images to print media and a source of first and second print media, the first print media differing from the second print media in at least one substrate attribute. A paper path network conveys the first and second print media to at least the first marking engine and for conveying media with the applied images from the first and second marking engines to a common output destination. The printing system has a first mode of operation in which images are applied to the first print media substrate by at least the first marking engine and a second mode of operation in which the first marking engine is modified to apply images to the second print media.

DETAILED DESCRIPTION

Figure 1:
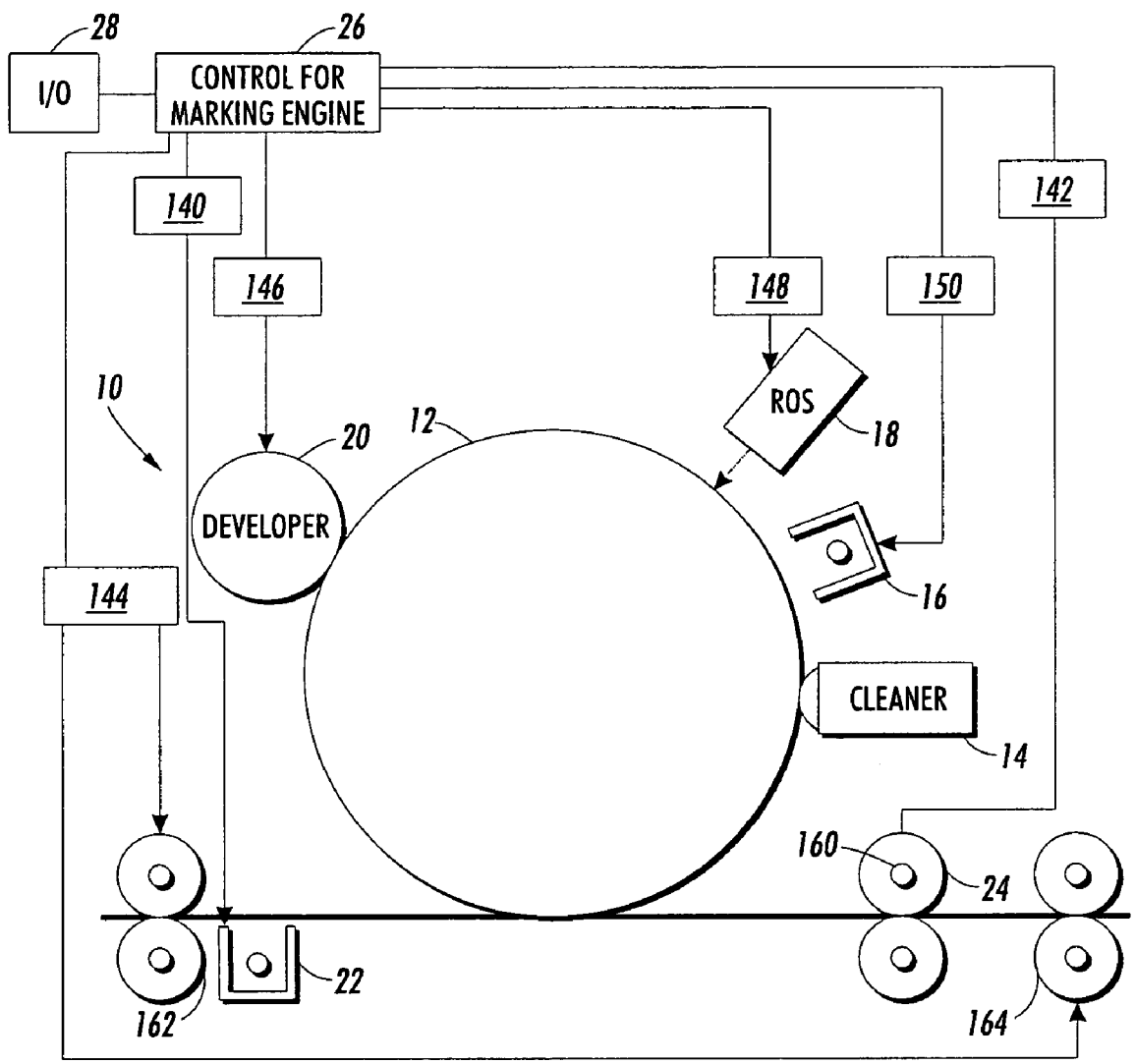
FIG. 1 is a simplified partially-elevational, partially-schematic view of an image marking engine.

Aspects of the present exemplary embodiment relate to a printing system and method for printing off-normal print media as well as normal print media. The system allows modification of the xerographic subsystems of one or more marking engines to modify throughput rate and/or other marking engine parameters through scheduling algorithms which comprehend subsystem temporal latitude limits when running off-normal media.

The printing method may include processing a print job stream to identify at those images which are to be printed on a first substrate, such as an off-normal substrate having a substrate attribute which is different from a second substrate, such as a normal substrate. One or more of at least two marking engines in the printing system which are configured for printing images of a common print job stream is selected to print the identified images on the off-normal first substrate. An operating parameter of the selected marking engine(s) is modified from a set point for the normal substrate to a modified set point for the first substrate, based upon the substrate attribute of the off-normal substrate. The identified images are then sent to the selected marking engine to be printed. All of these steps may be carried out automatically, by components of the printing system, without any input by a user. The process can be reversed for returning to normal printing.

The term "marking engine" is used herein generally to refer to a device for applying an image to print media. Print media generally refers to a usually flimsy physical sheet of paper, plastic, or other suitable physical print media substrate for images, whether precut or web fed. The terms "normal print media" and "off-normal print media" are relative terms used to distinguish a first type of print media, which can be any conventional print media, from a second type of print media, which because of its attributes, such as weight, surface roughness, surface coating, combinations thereof, or the like places different demands on a marking engine for achieving optimal image quality, as compared with the normal print media. A "print job" is normally a set of related sheets, usually one or more collated copy sets copied from a set of original document sheets or electronic document page images, from a particular user, or which are otherwise related. "Throughput rate" can be expressed, for example, in terms of prints per minute (ppm) of the printing system, or time for a print job or a plurality of print jobs in a queue to be completed.

The printing system may have a first mode of operation in which normal print media is printed by one or more marking engines and a second mode of operation in which one or more of the marking engines is modified to accommodate off-normal print media. In this way a first print job may be printed by the system which includes all normal print media and a second print job printed by the printing system in which at least a portion of the print job is printed on off-normal print media. The advantages of such a system are readily apparent. For example covers, tabs, inserts and the like for a document may be printed on off-normal print media by the same printing system as is used for other pages of the document. The printing of the off-normal sheets on one marking engine may be performed contemporaneously with printing of normal sheets on another marking engine.

The term "printing system," as used herein, can encompass any apparatus, such as a digital copier, bookmaking machine, facsimile machine, multi-function machine, etc., which performs a print outputting function for any purpose.

The printing system may incorporate "tandem engine" printers, "parallel" printers, "cluster printing," "output merger," or "interposer" systems, and the like, as disclosed, for example, in U.S. Pat. Nos. 4,579,446; 4,587,532; 5,489,969 5,568,246; 5,570,172; 5,596,416; 5,995,721; 6,554,276, 6,654,136; 6,607,320, and in copending U.S. application Ser. No. 10/924,459, filed Aug. 23, 2004, for Parallel Printing Architecture Using Image Marking Engine Modules by Mandel, et al., and application Ser. No. 10/917,768, filed Aug. 13, 2004, for Parallel Printing Architecture Consisting of Containerized Image Marking Engines and Media feeder Modules, by Robert Lofthus, the disclosures of all of these references being incorporated herein by reference. A parallel printing system typically feeds paper from a common paper stream to a plurality of printers, which may be horizontally and/or vertically stacked. Printed media from the various printers is then taken from the printer to a finisher where the sheets associated with a single print job are assembled. Variable vertical level, rather than horizontal, input and output sheet path interface connections may be employed, as disclosed, for example, in U.S. Pat. No. 5,326,093 to Sollitt.

Figure 2:
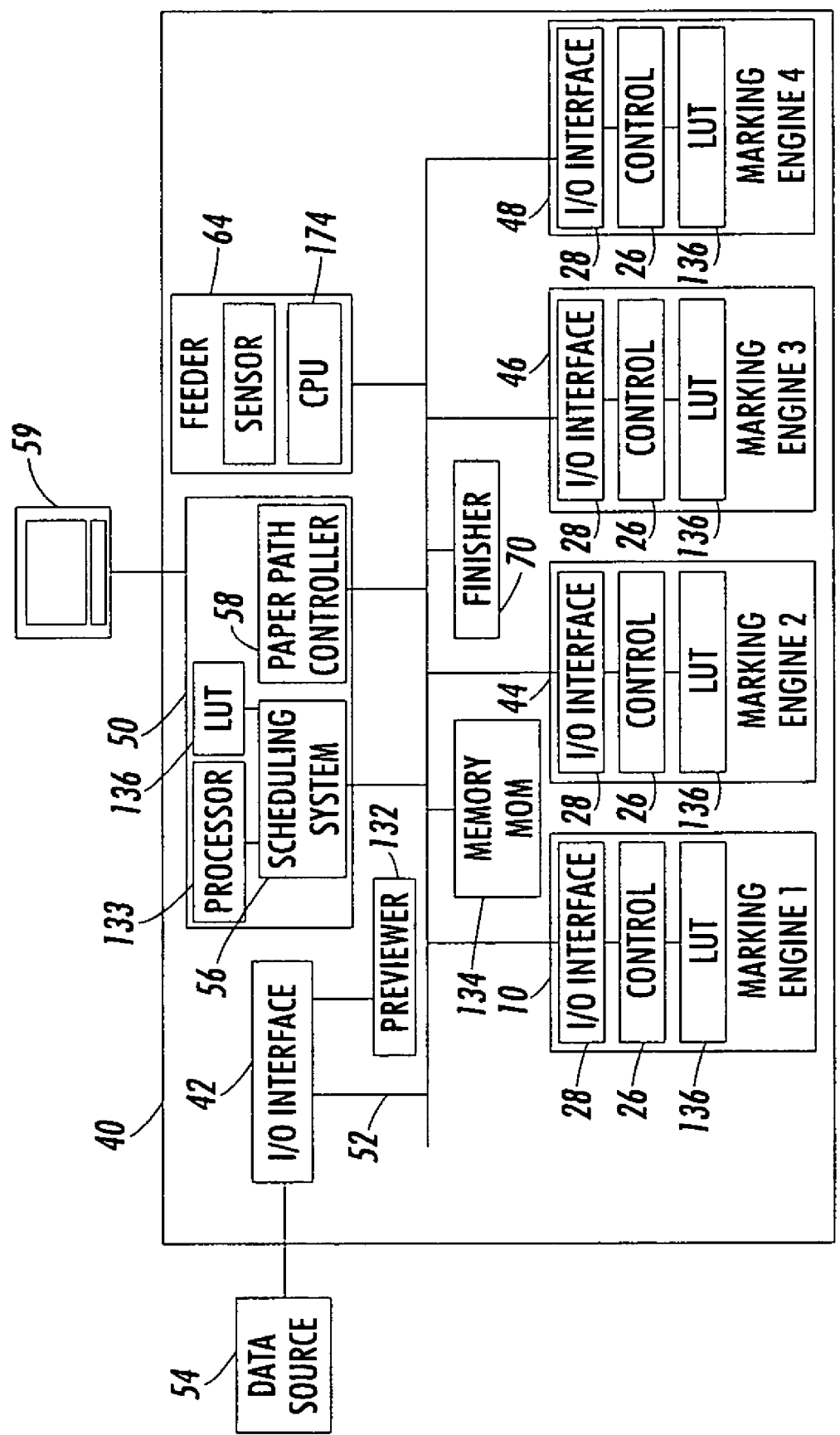
FIG. 2 illustrates an exemplary printing system comprising multiple marking engines.
Figure 3:
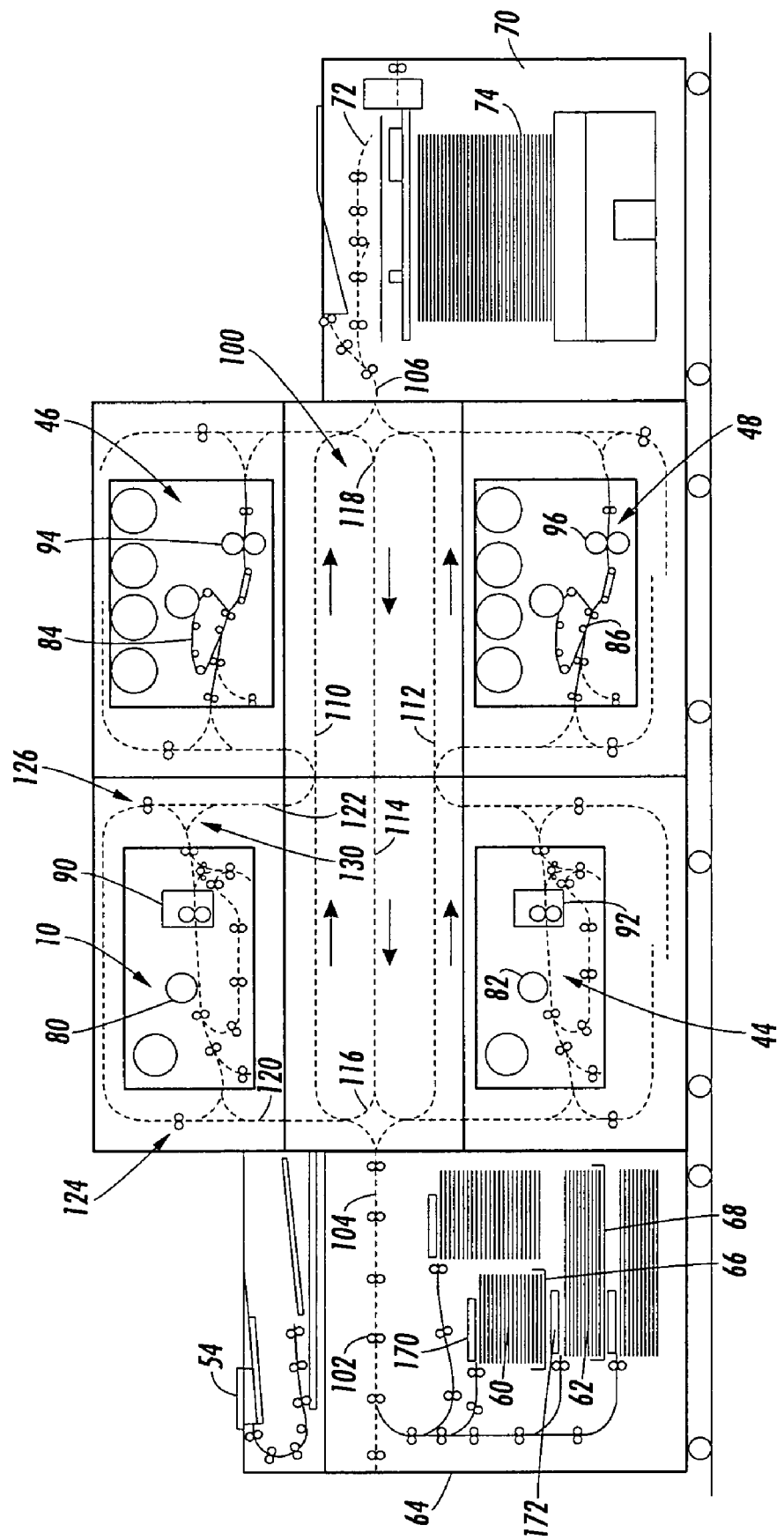
FIG. 3 is a sectional view of the exemplary printing system of FIG. 2, incorporating a plurality of marking engines of the type illustrated in FIG. 1.

As illustrated in FIG. 1, a marking engine 10 serves as a replaceable xerographic module for a printing system, such as that shown in FIGS. 2 and 3. The marking engine 10 includes many of the hardware elements employed in the creation of desired images by electrophotographical processes. In the case of a xerographic device, the marking engine typically includes a charge retentive surface, such as a rotating photoreceptor 12 in the form of a belt or drum. The images are created on a surface of the photoreceptor. Disposed at various points around the circumference of the photoreceptor 12 are xerographic subsystems which include a cleaning device generally indicated as 14, a charging station 16 for each of the colors to be applied (one in the case of a monochrome printer, four in the case of a CMYK printer), such as a charging corotron, an exposure station 18, which forms a latent image on the photoreceptor, such as a Raster Output Scanner (ROS) or LED bar, a developer unit 20, associated with each charging station 16 for developing the latent image formed on the surface of the photoreceptor by applying a toner to obtain a toner image, a transfer unit 22, such as a transfer corotron, transfers the toner image thus formed to the surface of a print media substrate, such as a sheet of paper, and a fuser 24, which fuses the image to the sheet. The fuser generally applies at least one of heat and pressure to the sheet to physically attach the toner and optionally to provide a level of gloss to the printed media. In any particular embodiment of an electrophotographic marking engine, there may be variations on this general outline, such as additional corotrons, cleaning devices, or, in the case of a color printer, multiple developer units. The xerographic subsystems 14, 16, 18, 20, 22, and 24 are controlled by a marking engine controller 26 such as a CPU, which includes actuators which adjust the xerographic subsystems to modify various xerographic operating parameters, such as development parameters, image transfer parameters, fuser parameters, and exposure parameters to produce high quality prints. While the controller 26 is illustrated as a single unit, it is to be appreciated that the actuators may be distributed throughout the marking engine, for example, located in the xerographic subsystems. The marking engine controller 26 is linked to an input/output interface 28, and may be also linked to other known components, such as a memory, a marking cartridge platform, a marking driver, a function switch, a self-diagnostic unit, all of which can be interconnected by a data/control bus.

Development parameters may include the developer potential, which affects the Developed Mass Area (DMA), a measure of the amount of material developed on the photoconductive surface in milligrams/cm$^2$. Image transfer parameters may include transfer currents applied by the transfer device to transfer the toner to the print media, which affect the efficiency of the toner transfer. Fuser parameters may include fuser roll temperature which is changed by varying the power to the fuser, and or fuser roll pressure, both of which affect the degree to which the image is fixed to the print media and/or the level of gloss of the image. Exposure parameters may include the exposure power, which varies with the intensity of exposure applied to the photoreceptor.

While particular reference is made to electrophotographic printers, suitable marking engines may also include ink-jet printers, including solid ink printers, thermal head printers that are used in conjunction with heat sensitive paper, and other devices capable of marking an image on a substrate. Each of the marking engines can have a different processing speed capability.

With reference to FIG. 2, an exemplary printing system 40 is shown. The printing system includes an input output interface 42, a plurality of marking engines 10, 44, 46, 48 and a common control system 50, all interconnected by links 52. The links can be wired or wireless links or other means capable of supplying electronic data to and/or from the connected elements. Exemplary links include telephone lines, computer cables, ISDN lines, and the like. A data source 54, such as a personal computer, network server or scanner, serves as an image input device. The network server, may, in turn, be linked to one or more workstations, such as personal computers (not shown). The input output interface 42 may include conversion electronics for converting the image-bearing documents to image signals or pixels, or this function may be assumed by the control system or the marking engines themselves. Typically, the computer network is used to generate print jobs, wherein each job includes the image data in the form of a plurality of electronic pages and a set of processing instructions. In the present embodiment, these processing instructions may include instructions regarding the print media to be used for pages of the print job. For example, a print job may include information such as the substrate type, and optionally also the size of the paper to be used, such as:

| Page | Substrate type |
|------|----------------|
| 1 | off-normal substrate A |
| 2 | normal substrate B |
| 3 | normal substrate B |
| 4 | off normal substrate C | where off-normal substrate A may be for example, a coated heavy weight stock, off-normal substrate C may be a non-coated heavy weight stock and normal substrate B a conventional, medium weight stock, all of letter size.

Subsequently, each job is converted into a representation written in a page description language (PDL) such as PostScript™ containing the image data. Where the PDL of the incoming image data is different from the PDL used by the digital printing system, a suitable conversion unit converts the incoming PDL to the PDL used by the digital printing system. The suitable conversion unit may be located in the interface unit 42 or elsewhere. Other remote sources of image data 54 such as a floppy disk, hard disk, storage medium, and the like are also contemplated. The control system 50 includes a planner/scheduler 56 and a processing component 58. An operator of the system 40 may communicate with the control system 50 by means of a communication station 59, such as a touch screen, keyboard, or the like.

For on-site image input, an operator may use the scanner 54 to scan documents, which provides digital image data including pixels to the interface unit 42. Whether digital image data is received from scanner or computer network, the interface unit 42 processes the digital image data in the form required to carry out each programmed job. The interface unit 42 is preferably part of the digital printing system. However, the computer network or the scanner may share the function of converting the digital image data into a form which can be utilized by the digital printing system 10.

While FIG. 2 shows four marking engines 10, 44, 46, 48 by way of example, which may be similarly configured to the marking engine 10 illustrated in FIG. 1, it will be appreciated that the printing system 40 may include fewer or more than four marking engines, such as two, three, five, six, or eight marking engines. The marking engines may be electrophotographic printers, inkjet printers, including solid ink printers, and other devices capable of marking an image on a substrate. The marking engines can be of the same print modality (e.g., process color (P), custom color (C), black (K), or magnetic ink character recognition (MICR)) or of different print modalities. The marking engines all communicate with the control system 50.

FIG. 3 illustrates an exemplary printing system 40 of the type illustrated in FIG. 2. While FIG. 3 shows a combination digital copier/printer, the printing system may alternatively be a copier or printer that outputs prints in whatever manner, such as a digital printer, facsimile, or multifunction device, and can create images electrostatographically, by ink-jet, hot-melt, or by any other method. The marking media used by the marking engine can include toner particles, solid or liquid inks, or the like.

In the exemplary printing system of FIG. 3 a plurality of marking engines 10, 44, 46, 48 of the type shown in FIG. 1, are linked for parallel printing of documents within the system. Each marking engine can receive image data, which can include pixels, in the form of digital image signals for processing from the computer network by way of a suitable communication channel 52, such as a telephone line, computer cable, ISDN line, etc.

The illustrated printing system 40 includes two black (K) 10, 44 and two additional marking engines 46, 48, which may be of the same print modality or a different print modality, such as process color marking engines. The marking engines may all be fed with print media 60, 62 from a print media source 64, such as a high speed paper feeder, herein illustrated as including a plurality of paper trays 66, 68, etc. Each document feeder tray may include print media having different attributes such as roughness, coatings, weight, and the like. Print media 60 fed from tray 66, for example, may be "normal" print media, while print media 62 fed from tray 68 may be "off-normal" print media, such as heavy weight stock or coated stock. Other trays in the feeder 64 may provide the same or different print media. In alternative embodiments, the marking engines can be fed with print media from separate sources. For example, the source of print media may be distributed throughout the printing system, such as each marking engine having its own dedicated supply of one or more of print media 60, 62. Or, the source of print media may supply fewer than all marking engines. In general, the printing system is configured such that at least one of the marking engines 10, 44, 46, 48 can receive, and thus print, both normal and off-normal print media. In one embodiment, the control system 50 communicates with the feeder 64 for selecting one or more print media 60, 62 for a particular print job. Printed media from the marking engines 10, 44, 46, 48 is delivered to a common output destination, such as a finisher 70, herein illustrated as including a plurality of output trays 72, 74.

The marking engines 10, 44, 46, 48 each include an imaging component 80, 82, 84, 86 comprising the xerographic subsystems 12, 14, 16, 18, 20, and 22 (FIG. 1) and an associated fuser 90, 92, 94, 96, respectively. The imaging component applies toner to the print media to form the image which is then fused by the fuser. The toner used may be the same for each marking engine of a particular print modality (e.g., process color, custom color, or black) although it is also contemplated that different marking engines of the same print modality may use different toners.

A print media transporting system 100 links the print media source 64 marking engines 10, 44, 46, 48 and finisher 70. The print media transporting system 100 includes a network of flexible paper pathways that feeds to and collects from each of the marking engines. The print media transporting system 100 may comprise drive members, such as pairs of rollers 102, spherical nips, air jets, or the like. The system 100 may further include associated motors for the drive members, belts, guide rods, frames, etc. (not shown), which, in combination with the drive members, serve to convey the print media along selected pathways at selected speeds. In the illustrated embodiment, print media 60, 62 from source 64 is delivered to one or more of the marking engines 10, 44, 46, 48 by a pathway 104 which is common to a plurality of the trays 66, 68, although it is also contemplated that the trays may be linked to the marking engines by different pathways. Thus, marking engine 10, for example, may receive print media 60 at one time and receive print media 62 at a different time. In marking engine 14, the print media is printed by imaging component 80 and fused by fuser 90. Similarly, print media is printed and fused by the respective imaging components and fusers in the other marking engines.

The network 100 of paper pathways allows print media which has been marked by two or more marking engines of the same or of different print modalities, to be assembled in a common stream. For example, print media is merged in pathway 106 and the combined outputs are delivered to the output destination 70. It will be appreciated that the marking engines may be configured for duplex or simplex printing and that a single sheet of paper may be marked by two or more of the marking engines or marked a plurality of times by the same marking engine, for example, by providing internal duplex pathways. The details of practicing parallel simplex printing and duplex printing through tandemly arranged marking engines are known and can be generally appreciated with reference to the foregoing cited U.S. Pat. No. 5,568,246.

The pathways of the illustrated network 100 may include at least one main downstream highway 110, 112 (two in the illustrated embodiment) and at least one upstream highway 114. The downstream and upstream highways may be generally parallel and travel generally horizontally, although other arrangements are also contemplated. Ends of the highways 110, 112, 114 are connected at upstream and downstream ends thereof by clover leaf intersections 116, 118, respectively. Pathways, such as pathways 120, 122, feed from the main highways to and from the marking engines.

The pathways 120, 122, etc. of the network 100 may include inverters, reverters, interposers, bypass pathways, and the like, as known in the art, to direct the print media 60, 62 between the highway and a selected marking engine or between two marking engines. For example, each marking engine has an inverter assembly 124 on the upstream side and another inverter assembly 126 on the downstream side. The inverters may optionally include registration capability. Paths 130 allow the print media to bypass the input or exit inverter assemblies. In order to maximize marking paper handling reliability and to simplify system jam clearance, the marking engines are often run in a simplex mode. The sheets exit the marking engine image-side up so they are generally inverted before compiling in the finisher 70. Control station 59 allows an operator to selectively control the details of a desired print job.

The speed at which print media travels through the network need not be the same in all the highways and pathways. For example, in a parallel printing system the sheets are transported through the marking engines at an optimum velocity, but in order to merge the sheets from two or more marking engines together without overlapping them, the sheets are accelerated up to a higher velocity. A similar situation occurs when providing a stream of blank media to two or more marking engines. The velocity of the highways is therefore generally higher than the velocity used in the marking engines.

With reference once more to FIG. 1, the planner/scheduler 56 plans and schedules the printing of a print job including selection of the marking engines to be used and the route of each sheet of the print job through the system. While the functions of planning and scheduling can be performed by separate electronic processing components, for convenience, these will be described as being performed by a single planning and scheduling processing component 56. The planner/scheduler 56 schedules print jobs based on various constraints, such as optimizing the output of the printing system. Various methods of scheduling print media sheets may be employed. For example, U.S. Pat. No. 5,095,342 to Farrell, et al.; U.S. Pat. No. 5,159,395 to Farrell, et al.; U.S. Pat. No. 5,557,367 to Yang, et al.; U.S. Pat. No. 6,097,500 to Fromherz; and U.S. Pat. No. 6,618,167 to Shah; U.S. application Ser. Nos. 10/284,560; 10/284,561; and 10/424,322 to Fromherz, all of which are incorporated herein in their entireties by reference, disclose exemplary planner/schedulers which can be used to schedule the print sequence herein, with suitable modifications to allow for scheduling of printing of monochrome pages on a monochrome marking engine or on a color marking engine, depending on the user selected constraints to be applied.

The planner/scheduler 56 receives information about the print job or jobs to be performed from a previewer 132 which may be associated with the input output interface 42 or with the planner/scheduler. The planner/scheduler 56 may comprise a print job stream processor 133 which processes the print job stream to identify images to be printed with a selected substrate from the at least two different substrate types. The planner/scheduler 56 selects one or more of the at least two marking engines 10, 44, 46, 48 to print the identified images on the selected print media substrate, based on the substrate attribute(s) of the selected print media substrate and the current capabilities and/or latent capabilities of the marking engines and proposes an appropriate route for the print media to follow in each of the print jobs. The current capabilities reflect the current state of a marking engine. The latent capabilities are those which the marking engine is capable of providing through automated modification to the xerographic systems. Where more than one marking engine is capable of accommodating the off-normal print media, the planner/scheduler selects one or more of the marking engines to perform the off-normal printing. The selection may be based on optimizing throughput of the printing system or other variables, such as achieving a desired image quality and/or consistency between images from different marking engines or by selecting the marking engine which has the greatest latitude for printing on the selected substrate.

The planner/scheduler 56 may include or access a memory which stores a model of the machine 134. The model of the machine includes updated information concerning the current states/capabilities of each of the marking engines 10, 44, 46, 48 and other components of the printing system, such as whether they are online or offline, and their latent capabilities. Through communication between the planner/scheduler and the various marking engines 10, 44, 46, 48 and/or the model of the machine, the planner/scheduler 56 knows the current state of each marking engine and its latent capabilities, which information may be updated and stored in the model of the machine. Information which may be stored in the model of the machine may include current capabilities, such as the attributes of the print media that the marking engine is currently set up for handling, as well as the ranges of paper weights and other substrate attributes that the marking engine is capable of handling though modification of the xerographic subsystems (its latent capabilities). The model of the machine may also include more detailed information, such as the temperature variation under load which is predicted when a particular print media substrate is run on a particular marking engine from which future states of the marking engine can be predicted.

For example, the planner/scheduler 56, by reference to the model of the machine 134, may determine that two color marking engines 46, 48 are available for printing but that neither is currently set up for marking heavyweight paper of 350 gsm. From the model of the machine, the planner/scheduler determines that a first of the marking engines 46 is currently set for marking paper weights of 40-100 gsm. The model of the machine also stores the information that the first marking engine 46 can be modified to accommodate paper weights of 150-200 gsm. The model of the machine indicates that the second color marking engine 48 is also currently set for marking paper weights of 40-100 gsm and can be modified to accommodate paper weights of 300-400 gsm. The planner/scheduler confirms with the second marking engine 48 that it will be capable of executing the modifications for printing 300-400 gsm print media by the scheduled future time at which the heavy weight print media is to be printed. The CPU 26 of the marking engine 48 determines how long it will take for the xerographic subsystems to be modified, based on information such as the current set point for the fuser 24 and other parameters of the xerographic subsystems, and confirms that it will be ready at the specified time, if it is capable of doing so.

While the operations of the planner/scheduler 56 are described with reference to a single job, it will be appreciated that the planner/scheduler may consider several print jobs in a queue and may schedule printing of print jobs from the queue contemporaneously or in an optimum sequence to optimize throughput of the printing system and/or other variables, such as image quality. Additionally, while the planner/scheduler 56 is described as comprising the processor 133 for processing the print job stream to identify images to be printed with a selected substrate from the at least two different substrate types, the functions of the print job stream processor may be assumed by another component of the printing system such as the input output interface 42, or by a processor outside the printing system such as one associated with the network 54 or with individual workstations. Where the planner/scheduler does not include the processor 133, information which enables the planner/scheduler to identify the images to be printed with a selected substrate is communicated to the planner/scheduler by the processor 133.

The planner/scheduler 56 confirms with each of the system components, such as marking engines, inverters, etc. that they will be available to perform the desired function, such as printing, inversion, etc., at the designated future time, according to the proposed schedule. Optionally, once the route has been confirmed in this way, any modifications to a marking engine which is to print off-normal print media are determined by the individual marking engine's CPU 26 so that the marking engine is optimized for the print media by the time the print media arrives. It is also contemplated that some or all of the functions of the CPU 26 may be assumed by the control system 50. For example, the control system 50 communicates with the marking engine to be modified such that at least one of the xerographic parameters of the marking engine are modified from a normal set point, which is used for normal print media to an optimum set point for the off-normal print media to be printed. The modifications made may depend on the attributes of the off-normal print media and the available settings and configuration of the xerographic subsystems of the marking engine.

The processing component 58 may serve as a paper path controller, which routes the sheets through the system, as well as controlling the switch positions which direct the print media through the modules, in order to execute a print job stream. Images to be printed on the off-normal print media are sent by the paper path controller 58 to the marking engine which has been modified to accommodate the particular off-normal media. The modified marking engine prints the selected images on the off-normal print media which can be combined with print media printed by other marking engines into the finished job at the output destination 70.

For example, the marking engine CPU 26 and/or the control system 50, in cooperation with the marking engine 10, 44, 46, 48, controls at least one of the xerographic subsystems, such as the charging station 16, exposure station 18, development station 20, fusing station 24, transfer station 22, or a combination thereof of a marking engine destined to receive off-normal print media to accommodate the demands of the off-normal print media. Different modifications may be appropriate for different print media, depending on the attributes. The marking engine CPU 26 (or the planner/scheduler 56) may access an algorithm, such as a look up table (LUT) 136 which provides the appropriate modifications to the xerographic subsystems for a plurality of off-normal print media types, as well as for normal print media, and determine the appropriate modifications. As will be appreciated, the appropriate modifications for any particular print media substrate may be different for each of the marking engines or for groups of the marking engines. As a result of the modification, the images generated on the off-normal media are of better quality than without the modification and/or the overall throughput of the printing system is improved.

For example, as illustrated in FIG. 1, a plurality of actuators 140, 142, 144, 146, 148, 150 which may be associated with the marking engine control 26 and under the control thereof, allow adjustment of marking engine subsystems. The subsystems may each have a plurality of discrete set points or a range of set points which can be selected. For example, the fuser 24 may have several discrete temperature settings. A first of the set points may be considered a normal set point as it is used for general printing. The control system 26 may use the look up table 136 to select a modified set point more suitable for the off-normal print media from the setpoints available. The modified set point selected is generally an optimum set point for the subsystem which, allowing for any constraints which may be applicable, best matches the requirements of the off-normal print media to be printed.

A first actuator 140 may allow a setting on the transfer device 22 to be adjusted from a normal set point for substrates to a modified set point based upon a substrate attribute of the selected off-normal print medium. In this way, the marking engine CPU 26 can control a transfer parameter of the marking engine. For example, the actuator 140 adjusts the transfer current, which effects transfer of the image to the print media. In general, higher transfer currents are used for heavier weight papers to ensure transfer of the image.

A similar actuator 142 may be provided for the fuser 24, whereby the control system 26 can control the adjustment of a fusing parameter by changing a setting on the fuser 24 from a normal set point for substrates to a modified set point, based upon a substrate attribute of the selected off-normal substrate. The modification can be such as to maintain or to achieve at least a minimum predetermined fix level for adhering the image to the print media, while maintaining operating throughput. For example, the actuator 142 may adjust power to a fuser roll heater 160. More power may be supplied for heavier weight print media than for lighter weight print media. This enables reduced fuser temperature drop for the heavier weight print media without sacrificing throughput rate. The control system 50, via the CPU 26, can thus affect an increase in fuser operating temperature in one marking engine for heavyweight print media to maintain a minimum fix level while maintaining operating throughput.

Another actuator 144 may adjust throughput of print media through the marking engine, for example by adjusting the speed at which the print media travels through the fuser. In the illustrated embodiment, upstream and downstream pairs of drive rolls 162, 164, or other drive members, are adjusted such that heavier weights of print media are conveyed through the marking engine at a slower speed than lighter weight print media. Alternatively or additionally, the inverters 124 and 126 (FIG. 3) may be used to adjust the speed of the print media through the marking engine. The control system 50, via the CPU 26, can thus use the information regarding print media to decrease the throughput for covers/inserts/tabs in one of the marking engines.

Although slowing the print media in the marking engine affects the throughput of that marking engine, the overall productivity of the printing system need not necessarily be reduced if the other marking engines are running at normal productivity and the modified marking engine does not constitute a rate limiting factor. If the slowing of the print media is likely to affect the overall printing system throughput, the use of the actuator 144 may be restricted to cases where the marking engine is unable to accommodate off-normal printing by modification of other xerographic parameters alone.

Another actuator 146 allows adjustment of a development parameter, such as developer potential, by changing a setting on the developer 20 from a normal set point for normal substrates to a modified set point based upon a substrate attribute of a selected substrate. This may include changing a bias voltage on the developer roll or the charge voltage on the photoreceptor, which changes the electrostatic field ton the photoreceptor. Modifying the developer may include adjusting a development parameter to increase developed mass area (DMA). Thus, the adjustment may improve appearance of printed images on a print media with a higher surface roughness.

Other actuators 148, 150 may be provided for the exposure station 18 and charging corotron 16, respectively. In the case of the exposure station 18, the actuator 148 adjusts the power supplied to the exposure station which varies the number of photons emitted. In the case of the charging corotron 16, the actuator 150 increases or decrease the voltage contrast.

In addition to modifying xerographic subsystems to accommodate substrate attributes, one or more of the xerographic subsystems may be modified to accommodate marking media attributes, such as toner pile height and image coverage. At greater toner pile heights, for example, higher fusing temperatures may be employed to ensure that the toner is melted and adequately fused to the print media. Increased transfer currents may also be selected to ensure transfer of the marking media to the print media substrate. Image coverage is the percentage of the image print area which is exposed in the exposure station and thus relates to the area of the image which has toner applied to it.

While the actuators 140, 142, 144, 146, 148, 150 are described as being under the control of the individual marking engine CPU 26, it will be appreciated that the actuators may alternatively or additionally be under the control of the overall control system 50, particularly in the case where the look up table 136 is accessible to the control system 50.

The operator of the printing system 40 may communicate with the control system 50 via the user interface 59 regarding the location and/or type of the print media. For example, the operator may inform the control system 50 that print media 60 has been loaded in tray 66 and print media 62 has been loaded in tray 68. Alternatively, specific trays may be designated for specific types of print media. The model of the machine is updated with information on the locations of the different print media and their attributes. Accordingly, when a print job arrives at the printing system 40, the control system is able to confirm that there is print media 60, 62 of each of the specified types available for printing and the tray or trays 66, 68 in which the print media is located.

The CPU 26 can ascertain the modifications for the marking engine appropriate to the attributes of the respective print media from the look up table 136. The CPU is also able to determine the appropriate modifications.

Alternatively or additionally, in one embodiment, the trays 66, 68 may incorporate sensor systems 170, 172, respectively, for one or more print media attributes. For example, the sensor systems 170, 172, may include one or more of a weight sensor, which determines basis weight of the print media, a roughness sensor, which measures surface roughness, and a coating sensor, which determines some property of the coating, such as its gloss. The sensors feed this information to the planner/scheduler 56, either directly, or to indirectly, via a feeder CPU 174. The planner/scheduler 56 stores the information in the model of the machine so that is accessible to the planner/scheduler 56 when scheduling a print job.

Figure 4:
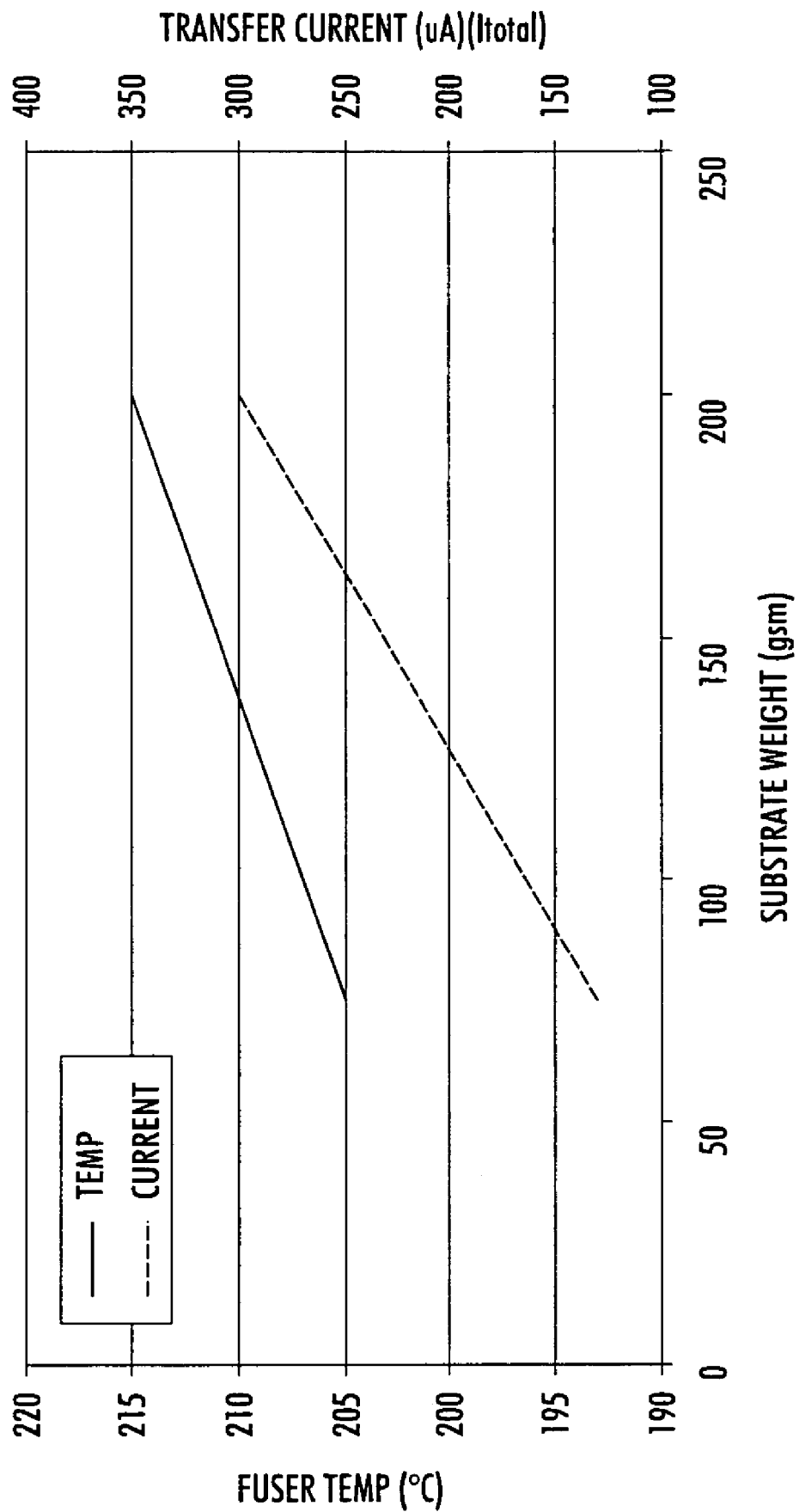
FIG. 4 illustrates exemplary data of the type which can be utilized in generating a lookup table for determining xerographic parameter values based on a detected substrate attribute.

The lookup table 136 (FIG. 2) may store xerographic parameter values, e.g., settings, for one or a plurality of particular sheet attributes, such as basis weight, textures (roughness), coating type, and the like. FIG. 4 illustrates exemplary data which can be utilized in the lookup table 136 for determining xerographic parameter values based on a substrate attribute, in this case, paper basis weight. The values contained in the lookup table are predetermined through a series of optimization tests for each substrate print quality, i.e., the values producing high quality images for a given substrate attribute may be experimentally predetermined. The lookup table may be embodied in a ROM or other memory storage device and include substrate attribute information and corresponding settings for one or more xerographic subsystem, in the illustrated embodiment, fuser temperature settings and transfer currents. The memory locations of the ROM are addressed based on the substrate attribute selected or detected. Where tray sensors 170, 172 are employed, the address word for addressing the ROM may include bits corresponding to the states of sensors and the states of microswitches in the supply tray where the substrates having substrate attributes are stored.

While the control system 50 is shown as a separate entity from the marking engines, it is to be appreciated that portions of the functions of the control system may be performed by the marking engines themselves and thus the control system may be distributed throughout the system.

In one aspect of the exemplary embodiment, all of the marking engines in the printing system are capable of accommodating normal (intermediate) weight paper and some or all of the marking engines are capable of accommodating higher or lower weight paper by adjustment of appropriate set points. In another aspect, one or more of the marking engines accommodates normal weight paper and another of the marking engines has settings which enable it to accommodate high or low weight paper, but not the normal weight paper.

Figure 5:
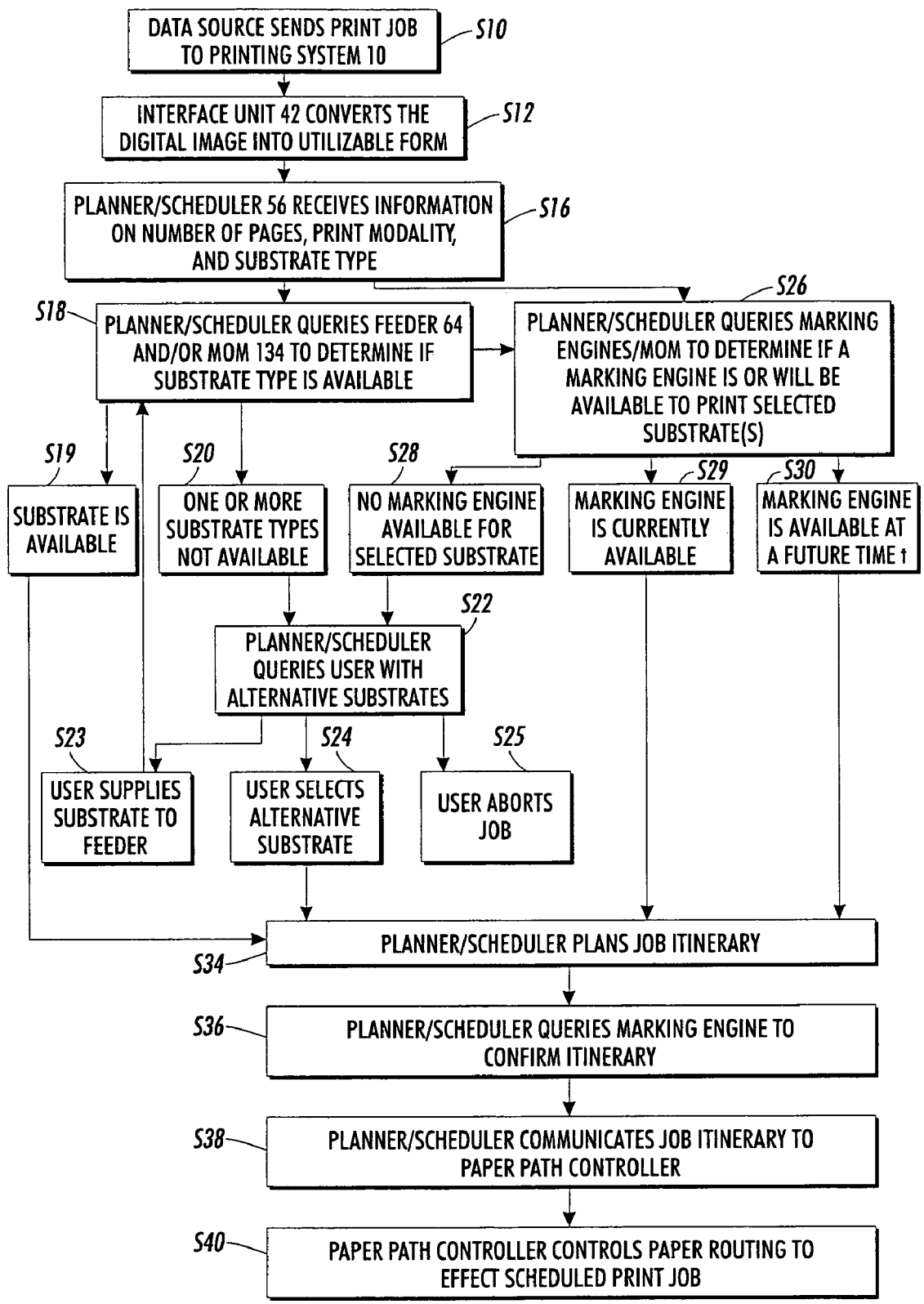
FIG. 5 is a flow diagram illustrating steps of an exemplary printing process.

FIG. 5 illustrates an exemplary print job showing some of the operations of the planner/scheduler 56 and marking engine CPU 26. It will be appreciated that the steps need not be performed in the order shown and may include additional steps. At step S10, a print job is sent by the data source to the printing system and arrives at the interface unit 42. At step S12, the interface unit converts the digital image data into a form which can be utilized by the digital printing system 10. At step S16 the interface unit sends information to the planner/scheduler 56, from which the planner/scheduler can determine the number of pages, the print modality of the image to be printed on each page (e.g., color or black and white), and the substrate type to be used.

Typically, after step S16 is complete, the process is an iterative one which through gradual refinement, determines an itinerary for performing the print job. For example, each page, the planner/scheduler queries the feeder 64 and/or the model of the machine 134 to determine whether the selected print media substrate is available (step S18). The feeder/MOM may communicate that the substrate is available (step S19), or that the substrate is not available (step S20). If the substrate is not available, the planner/scheduler may query the user, via the user interface 59, with alternatives (step S22). These may include using an alternative substrate, the user feeding the feeder with the substrate, or aborting the job. At the next step the user, via the user interface selects an option, which may to feed the feeder with the required substrate (step S23), to select an alternative substrate (Step S24) or to abort the job (S25). If the user elects to feed the tray with the required substrate, the user interface may direct the user to place the media in a preselected tray.

If the substrate is available at step S19 or if the user selects an alternative substrate at step S24, the planner/scheduler may query the marking engines (or the model of the machine) (step S26) to determine whether any of the marking engines can print the image on the selected substrate. Alternatively, step 26 may be performed contemporaneously with one or more of the previously described steps S18-S24). The marking engines/MOM may respond that none can print the image on the selected substrate (step S28), that a marking engine is currently available (step S29) or that the marking engine will be available at a future time t (step S30). If none of the marking engines can print the image on the selected substrate either currently or at a future time, the planner/scheduler queries the user via the user interface (step S22). The planner/scheduler, via the user interface, may offer to print the page(s) on an alternative print media, based on what is available in the system and what one or more of the marking engines is able to handle (this may involve posing additional queries to the feeder and the marking engines). If a marking engine is currently available, the planner/scheduler may select that marking engine to print the page(s) on the selected substrate. Or, if no marking engine is currently available, the scheduler determines, through appropriate queries to the marking engines, at what time the marking engine will have completed any modifications needed for printing on the substrate, and thus be available. At step S34, the planner/scheduler plans an itinerary and confirms the portions that each marking engine is to perform with the appropriate marking engine (step S36). This may be an iterative process, with several modified itineraries or portions of an itinerary being proposed before one is finally accepted by all the marking engines. Once a schedule is accepted, the marking engines prepare for printing the pages, which may include making modifications at appropriate times in advance of printing to enable the marking engine to print the selected substrate(s).

Once all the marking engines have confirmed the schedule, the planner/scheduler communicates with the paper path controller, which routes the print media substrate, based on the itinerary for the print job (steps S38 and S40).

The printing system thus described enables higher throughputs to be achieved than with a printing system in which an operator instructs the system to apply a skip pitch process when printing heavy weight papers.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of printing comprising:
   storing information on current capabilities and latent capabilities of at least two marking engines;
   processing a print job stream to identify at least one image to be printed on a first substrate selected from at least two substrates, the first substrate having a different substrate attribute from a second of the at least two substrates;
   selecting one of at least two marking engines which are configured for printing images of a common print job stream to print the identified images on the selected first substrate based on the stored information on current capabilities and latent capabilities;
   where the current capabilities cannot handle the substrate attribute, modifying an operating parameter of the selected one of the at least two marking engines from a set point for the second of the substrates to a modified set point for accommodating the substrate attribute of the selected first substrate;
   sending the at least one identified image to the selected one of the at least two marking engines to be printed; and
   forming a completed image on the selected first substrate with the selected one of the at least two marking engines.

2. The method of claim 1, wherein the operating parameter is selected from the group consisting of: development parameters, fuser parameters, image transfer parameters, exposure parameters, and combinations thereof.

3. The method of claim 2, wherein the operating parameter includes a development parameter and the modifying comprises modifying the development parameter by changing a setting on a developer unit from a normal set point for the second substrate to a modified set point based upon the substrate attribute of the first selected substrate.

4. The method of claim 3, wherein the modifying of the development parameter changes the developed mass area of the image.

5. The method of claim 2, wherein the operating parameter includes a fusing parameter and the modifying comprises modifying the fusing parameter by changing a setting on a fuser of the marking engine from a normal set point for the second substrate to a modified set point based on the substrate attribute of the selected first substrate.

6. The method of claim 5, wherein the modifying of the fusing parameter changes an operating temperature of the fuser.

7. The method of claim 2 wherein the operating parameter includes an image transfer parameter and the modifying comprises modifying the image transfer parameter by changing a setting on a transfer unit from a normal set point for the second substrate to modified set point based upon the substrate attribute of the selected first substrate.

8. The method of claim 7, wherein the modifying of the transfer parameter changes a transfer current of the transfer unit.

9. The method of claim 1, further comprising outputting the formed completed image on the selected first substrate to an output destination which is common to the at least two marking engines.

10. The method of claim 1, wherein the processing of a print job stream further comprises identifying at least one image to be printed with another selected substrate from the at least two substrates, the other selected substrate having a different substrate attribute from the first substrate;
    sending the identified image to be printed with the other selected substrate to a second selected one of the at least two marking engines to be printed; and
    forming a completed image on the other selected substrate with the second selected one of the at least two marking engines.

11. The method of claim 10, further comprising scheduling and feeding of the completed images on the first selected substrate and the other selected substrate to an output destination which is common to the first and second marking engines in a predetermined sequence.

12. The method of claim 1, wherein the substrate attribute is selected from the group consisting of surface roughness, coating, substrate weight, and combinations thereof.

13. The method of claim 1, further comprising accessing a lookup table which, for at least the selected marking engine, associates substrate attributes with corresponding set points for xerographic parameters.

14. The method of claim 1, further comprising determining the substrate attribute of the selected substrate.

15. The method of claim 1, wherein the selecting the one of at least two marking engines comprises querying at least one of the first and second marking engines to identify a marking engine which is modifiable for printing the images on the selected first substrate.

16. The method of claim 1, wherein the modifying the xerographic parameter of the selected one of the at least two marking engines from a set point for the second of the substrates to a modified set point for the first substrate also accommodates an attribute of the marking media selected from toner pile height, toner area coverage, and combinations thereof.

17. A printing system comprising:
    at least two marking engines for printing images of a common print job stream;
    a processor for processing the print job stream to identify an image to be printed on a first substrate selected from at least two substrates, the first substrate differing in at least one attribute from a second of the at least two substrates;

a model of the machine which stores information on current capabilities and latent capabilities of the at least two marking engines;

a planner/scheduler in communication with the processor and model of the machine for selecting one of the at least two marking engines, based on the stored information on current capabilities and latent capabilities of the at least two marking engines, to print the identified image on the selected first substrate;

an actuator for modifying an operating parameter of the selected one of the at least two marking engines from a normal set point for the second substrate to a modified set point for the selected first substrate; and a processing component for sending the identified image to the selected one of the at least two marking engines to be printed.

18. The printing system of claim 17, further comprising a sensor for determining the substrate attribute of the selected first substrate.

19. The printing system of claim 17, wherein the operating parameter is selected from a group consisting of: development parameters, fusing parameters, transfer parameters, exposure parameters, and combinations thereof.

20. The printing system of claim 17, further comprising a network of paper paths for outputting the printed images on the selected substrate to an output destination which is common to the at least two marking engines.

21. The printing system of claim 17, wherein the processor processes the print job stream to identify an image to be printed on another substrate selected from at least two substrates, the other substrate differing in at least one attribute from the first substrate; and the planner/scheduler selecting a different one of the at least two marking engines from the first selected marking engine to print the identified image on the selected other substrate.

22. The printing system of claim 17, wherein fewer than all of the marking engines in the printing system are modifiable for printing the first substrate and wherein the planner/scheduler communicates with the marking engines in the printing system to identify one of the marking engines in the printing system which is modifiable for printing the first substrate.

23. A xerographic system comprising:

a first marking engine which applies images to print media;

a second marking engine which applies images to print media;

a source of first and second print media, the first print media differing from the second print media in at least one substrate attribute;

a model of the machine which stores information on current capabilities and latent capabilities of the at least two marking engines;

a paper path network for conveying the first and second print media to at least the first marking engine and for conveying media with the applied images from the first and second marking engines to a common output destination;

the printing system having a first mode of operation in which images are applied to the first print media substrate by at least the first marking engine and a second mode of operation in which one of the first marking engine and the second marking engine is selected, base on its stored latent capabilities, and is modified to apply images to the second print media.

24. The printing system of claim 23, further comprising a planner/scheduler for scheduling the application of images, the planner/scheduler communicating with the first marking engine to confirm that the first marking engine is capable of being modified to apply the images to the second print media.

25. The printing system of claim 24, wherein the planner/scheduler accesses a memory which includes information on the current states of the marking engines and their potential capabilities to identify a marking engine which is capable of being modified to apply the images to the second print media.

* * * * *